J. THOMSON.
Barometer.
No. 41,549.
Patented Feb. 9, 1864.
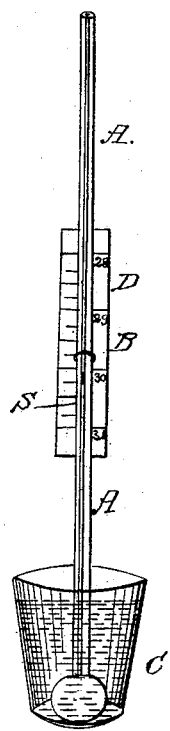
Witnesses
Hugh Campbell
Horace Read
Inventor.
John Thomson

UNITED STATES PATENT OFFICE.

JOHN THOMSON, OF WAYNE, ILLINOIS.

IMPROVEMENT IN BAROMETERS.

Specification forming part of Letters Patent No. 41,549, dated February 9, 1864.

*To all whom it may concern:*

Be it known that I, JOHN THOMSON, in the township of Wayne, county of Du Page, and State of Illinois, have invented a new and Improved Barometer for the Use of Farmers or Others; and I do hereby declare that the following is a full, clear, and exact description of the construction and operation thereof, reference being had to the accompanying drawing, and to the letters of reference marked thereon, making a part of this specification.

My invention consists in the use of a small globule of mercury, confined in a glass tube of small bore, and, floating therein, forms a barometer by being acted on by the direct pressure of the atmosphere. It is very sensitive to changes of weather, and by extending the length of the tube this small mercury-globule (which is the index of the instrument) may have an unlimited extent of range, and in some forms of this invention, without any change of principle, there will be no thermometer requisite to correct the changes of temperature in the measuring of altitudes.

To enable others skilled in the art to make and use my invention, I will proceed to describe its construction and operation.

The following will illustrate its principle: A A represents a glass tube similar to that of a thermometer, but longer in the stem—say twenty or twenty-four inches. It contains air and is open at the top.

S represents a small globule of pure mercury in the bore of the tube, thereby confining a given quantity of air to the bulb and lower portion of the tube.

C represents a common cup or tumbler for holding water.

D represents the index-scale attached to the tube, which, in this case, is numbered from above downward to correspond with the readings of the common mercurial barometer, and B represents a ring upon the stem of the tube, movable, so as to note the rise or fall of the floating globule of mercury between the various experiments.

Its manner of operation is as follows: The cup C is to be filled with water from some source of known and regular temperature and the instrument set into it. The temperature of the water will be immediately transmitted to the air in the bulb of the tube, thereby either expanding or contracting that portion under the mercury which divides the air into an upper and lower portion in the tube. The result of that change of temperature will be a rise or fall of the index, according to the pressure of the outside atmosphere acting through the top of the tube on the stopper within, thus indicating the state of the weather on the scale of inches and its parts.

It will be observed as indispensible in this case, that the water in the cup should be renewed at each successive experiment, so that the air in the bulb of the instrument be brought to its former temperature.

The resources for obtaining a uniform temperature are found in spring-water, fire, ice, the human body, &c.

In making or in the manufacture of these barometers as above the bulb is merely heated to such a degree as that a small drop of mercury then introduced to the tube will stand about midway of its length when the instrument is cooled to 50° of Fahrenheit's scale.

I do not limit myself to any particular form or position of tube, whether straight or coiled or otherwise; but

What I claim as my invention, and wish to secure by Letters Patent, is—

The application of a small globule of mercury to form a movable stopper or partition within a tube of small bore, and therein acting as a barometer, either by itself or in combination with the well-known mercurial barometer, and thereby forming a weather-glass.

JOHN THOMS N.

Witnesses:
HUGH CAMPBELL,
HORACE READ.